United States Patent Office 2,908,705
Patented Oct. 13, 1959

2,908,705

PROCESS FOR THE PREPARATION OF HYDROXY-ARYL THIOISOCYANATES

Günther Nischk, Leverkusen, Germany, assignor to Farbenfabriken Bayer Aktiengesellschaft, Leverkusen, Germany, a corporation of Germany No Drawing. Application February 26, 1957
Serial No. 642,362

Claims priority, application Germany April 12, 1956

8 Claims. (Cl. 260—454)

The invention relates to a process for the preparation of hydroxyaryl thioisocyanates. More especially, the invention is related to hydroxyaryl thioisocyanates prepared from aromatic compounds with at least one dithiocarbamate group and at least one hydroxy group.

It is known to convert aryl dithiocarbamates with sodium chlorite or sodium hypochlorite into the corresponding aryl thioisocyanates. According to another method, aryl thioisocyanates can be prepared by boiling aryl substituted thioureas with hydrochloric acid. However, these processes are unsuccessful if the aryl dithiocarbamates contain hydroxy groups, so that hydroxy thioisocyanates cannot be obtained by these methods.

Such hydroxy thioisocyanates can, however, be prepared by the action of thiophosgene on hydroxyaryl amines. Nevertheless, impure products are usually obtained which cannot be satisfactorily purified by distillation without heavy losses.

According to another process, hydroxyaryl amines in aqueous solution are converted by carbon bisulphide and a large excess of ammonia into the hydroxyaryl dithiocarbamates, which after being isolated and thoroughly dried with organic solvents, are reacted at temperatures between 80 and 100° C. in neutral organic solvents with phosgene to form hydroxyaryl thioisocyanates. In view of large losses of solvent when dehydrating the dithiocarbamates, this process is very uneconomical; it is not possible to dry in any other manner, particularly at elevated temperature, owing to the fact that the hydroxyaryl dithiocarbamates readily decompose. In addition, the yields obtained by this process are only in the region of 50%.

It is an object of the present invention to provide a new process for the production of hydroxyaryl thioisocyanates without the disadvantages of prior art. Another object is to provide a process for the manufacture of hydroxyaryl thioisocyanates in good yield and in a high state of purity. Further objects will appear hereinafter.

It has now been found that aryl thioisocyanates containing hydroxy groups can surprisingly be prepared with a substantially better yield than hitherto and without previous isolation and drying of the carbamate, by treating hydroxyaryl dithiocarbamates with phosgene, if phosgene is caused to act on an aqueous solution of an aromatic compound with at least one dithiocarbamate group and at least one hydroxy group, which is connected either directly or through an alkylene group to the aromatic ring system, except that a hydroxy group disposed directly on the ring system must not be in the ortho posision relative to an amino group.

The aryl dithiocarbamates containing hydroxy groups and serving as initial material are prepared in known manner from the corresponding amines by means of carbon bisulphide and ammonia or other alkalis. For the present process, it is possible to use all aromatic amines which contain one or more hydroxy groups in the molecule, whether these are directly bonded to an aromatic nucleus or are bonded thereto by way of alkylene groups. Polyvalent amines are also suitable as starting material. It is only those o-hydroxyaryl amines which lead to thioisocyanates having a tendency to cyclisation, such as is the case with many o-hydroxyaryl thioisocyanates, which cannot be used. Moreover, the aromatic ring systems, among which are also to be understood condensed ring systems such as naphtalene and anthracene ring systems as well as those of the diphenyl type or the simple benzene nucleus, can carry any suitable other substituents, such as for example one or more alkyl radicals or halogen atoms.

The following hydroxy amines may be mentioned as examples: p-aminophenol, m-aminophenol, p-aminobenzyl alcohol, m-aminobenzyl alcohol, 3-amino-6-methyl-phenol, 4-amino-6-methyl-phenol, 3-amino-6-isopropyl-phenol, 4-amino-2-chloro-3-methyl-phenol, 2-chloro-4-amino-benzyl-alcohol, 2-chloro-4-aminophenol, 3,5-dihydroxy-aniline, 5-hydroxy-phenylene-diamine-1,3, 1-amino-naphthol-5, 1-amino-naphthol-4, 1-amino-2-chloro-naphthol-5, 4-hydroxy-4'-aminodiphenyl, 4,6-dihydroxy-4'-aminodiphenyl, 1-hydroxy-4'-aminodiphenyl-methane, 4-amino-2,6-dimethylphenol.

The hydroxyaryl dithiocarbamate can be prepared from the beforementioned amino compounds in the conventional manner. As an example the procedure may be conducted as follows: 1 mol of a hydroxy amine is mixed with at least one mol of aqueous ammonia and diluted with water. 1 to 5 mols of carbon bisulphide are run in without external cooling and the mixture is stirred until the dithiocarbamate is formed. The original suspensions are usually transformed into a clear solution.

According to the present invention phosgene is now caused to set on the hydroxyaryl dithiocarbamate in an aqueous solution.

In contrast to the former processes carried out in an organic solvent, it is a particular advantage now to be able to work at low temperatures in the range from 0° to 50° C., preferably 5 to 20° C. this being very desirable owing to the aforementioned tendency of the aryl dithiocarbamates to decompose, so that in particular an initial rise in temperature is conveniently avoided by cooling. In the later stage of the procedure, more especially when free ammonia can no longer be detected and the reaction mixture tends to show an acidic reaction temperature may be allowed to rise owing to the exothermic reaction up to as high as 100° C. Moreover, the complicated and uneconomic drying operation is dispensed with. The effect of all these factors is that aryl thioisocyanates containing hydroxy groups can be obtained from the dithiocarbamates in yields up to 80% of the theoretical when using the novel process. According to a preferred embodiment phosgene is introduced into the aqueous solution of the hydroxyaryl dithiocarbamate at a temperature of approximately 5–10° C. until the solution is practically colourless and shows an acid reaction. The aqueous phase can advantageously be covered with an organic solvent, which takes up the thioisocyanate which is formed. This organic solvent is thereafter separated, washed until neutral and, after distilling off the solvent, the thioisocyanate which is formed is distilled in vacuo or dissolved and recrystallised.

The hydroxyaryl thioisocyanates are of importance as intermediates for the manufacture of unsaturated mustard oils, which may be prepared according to patent application Serial No. 547,553, filed November 17, 1955. The unsaturated mustard oils are useful as polymerisable compounds in the copolymerisation with, for instance, butadiene to give rubber elastic polymers. The products of the present process can further be employed in the manufacture of pharmaceutics. The reaction product of 3-hydroxy-benzene-isothiocyanate and allyl chloride is known to be an anthelmintic. Phosphoric esters prepared from hydroxyaryl isothiocyanates are of importance as pest-controlling agents.

The invention is further illustrated by the following examples all parts being by weight if not otherwise stated.

*Example 1*

330 parts of p-aminophenol are mixed with 500 parts by volume of 25% ammonia and diluted with 1200 parts of water. 250 parts of carbon bisulphide are then run in while stirring, a slight rise in temperature being observed. The mixture is stirred for another 4 hours. The clear solution is thereafter cooled to 10° C. with ice, 400 parts of benzene are added and phosgene is introduced while stirring vigorously. The temperature should initially not exceed 10° C. when the aqueous phase is practically colourless, the benzene layer is separated, washed with water until neutral and the benzene is distilled off in a water jet vacuum. The residue is distilled under high vacuum. B.P.$_{0.3\ mm.}$ 119–122° C. Yield: 340 parts=72.5% of the theoretical.

*Example 2*

330 parts of m-aminophenol are mixed with 500 parts by volume of 25% ammonia and diluted with 1200 parts of water. 250 parts of carbon bisulphide are now run in while stirring and stirring is continued until the suspension has completely dissolved. 400 parts of benzene are then added, the solution is cooled to 10° C. and phosgene is introduced while stirring until the aqueous layer has become colourless. The organic phase is separated, washed with water until neutral and the benzene is distilled off in a water jet vacuum. When the residue is distilled under high vacuum, it yields 370 parts of m-hydroxyphenyl isothiocyanate with the B.P.$_{0.3\ mm.}$ 120–124° C., that is to say 80% of the theoretical.

*Example 3*

350 parts by volume of a 25% ammonia solution are poured onto 250 parts of 1-methyl-2-amino-4-phenol and the mixture is diluted with 800 parts of water. 170 parts of carbon bisulphide are then run in and the mixture is stirred until the suspension has almost completely dissolved. The solution is then covered with 350 parts of benzene, cooled to 10° C. and then phosgene is introduced until the aqueous phase becomes colourless. The benzene layer is thereafter separated, washed neutral with water and clarified with active carbon. The benzene is driven off on a water bath and the residue is further distilled under high vacuum. Yield: 205 parts=61% of the theoretical; B.P.$_{0.3\ mm.}$ 122–126° C.

*Example 4*

330 parts of p-aminophenol are mixed with 500 parts by volume of 25% ammonia and diluted with 1200 parts of water. 250 parts of carbon bisulphide are now run in while stirring a slight rise in temperature being observed. The mixture is stirred for another 5 hours. The solution is then covered with 500 parts of toluylene cooled to 12° C. and then phosgene is introduced until the aqueous phase shows an acidic reaction. Without cooling the temperature rises slowly while further phosgene is introduced. After 60° C. has been reached the introduction of phosgene is suspended. The reaction mixture is stirred for another hour. The toluylene layer is thereafter separated, washed neutral with salt and dried with sodium sulfate. The toluylene is driven off in a water jet vacuum. The residue is distilled under high vacuum. B.P.$_{0.2\ mm.}$ 115–118° C. Yield: 310 parts.

*Example 5*

330 parts of m-aminophenol are mixed with 500 parts by volume of 25% ammonia and diluted with 1200 parts of water. 250 parts of carbon bisulphide are now run in while stirring and stirring is continued until the suspension has completely dissolved. Phosgene is introduced beginning at 8° C. while stirring until the aqueous layer has become colourless and shows an acidic reaction. Excess phosgene is destroyed while stirring for another hour at room temperature. A thick oil separates out which is then separated from the aqueous phase. The oil is distilled under high vacuum. It yields 350 parts m-hydroxyphenyl-isothiocyanate with the B.P.$_{0.3\ mm.}$ 119–124° C. The reaction product can be further purified by dissolving in toluylene and washing with water until neutral.

What is claimed is:

1. In the process for the preparation of hydroxyaryl isothiocyanates by reacting hydroxyaryl dithiocarbamates with phosgene the improvement wherein phosgene is reacted with an aqueous solution of an aromatic compound having at least one dithiocarbamate group and at least one hydroxy group selected from the group consisting of phenolic and benzyl hydroxy groups, the phenolic hydroxy group being in a position other than ortho to an amino group, the temperature at the beginning of the reaction being in the range of approximately 5–20° C.

2. A process for the preparation of hydroxyaryl isothiocyanates, which comprises reacting in an aqueous solution a phenol containing an amino group in a position other than ortho to the hydroxyl group, with $CS_2$ and a base to form a phenolic dithiocarbamate which is soluble in the aqueous reaction mixture, adjusting the temperature of the aqueous solution to 5–10° C., introducing phosgene into the solution until the solution is practically colorless and shows an acid reaction, simultaneously covering the aqueous phase with an organic solvent which dissolves the phenolic isothiocyanate formed by reaction of the dithiocarbamate with phosgene, separating the organic solvent containing dissolved isothiocyanate and recovering the latter from the organic solvent.

3. Process of claim 2 wherein the initial phenol is p-aminophenol.

4. Process of claim 2 wherein the initial phenol is m-aminophenol.

5. Process of claim 2 wherein the initial phenol is 1-methyl-2-amino-4-phenol.

6. Process of claim 2 wherein said organic solvent is selected from the group consisting of benzene and toluene.

7. Process for the preparation of a phenolic isothiocyanate which comprises introducing phosgene into a single-phase aqueous solution of a phenolic dithiocarbamate wherein the phenolic hydroxyl group is in a position other than ortho, the temperature of the solution being 5–20° C. when the addition of the phosgene begins, stirring the solution until reaction is complete and a thick oil separates from the aqueous phase, and recovering from the oil a phenolic isothiocyanate.

8. Process of claim 7 wherein the starting material is the dithiocarbamate of n-aminophenol, and the product separated from the oil phase is m-oxyphenol-isothiocyanate.

References Cited in the file of this patent

FOREIGN PATENTS 678,125   Great Britain _____ Aug. 27, 1952

OTHER REFERENCES

"Chemistry of Carbon Compounds," E. H. Rodd, volume 1, part B, 1952, pp. 892 and 898.